United States Patent
Shimanuki et al.

(10) Patent No.: US 6,777,121 B1
(45) Date of Patent: Aug. 17, 2004

(54) FUEL CELL SYSTEM AND GAS/LIQUID SEPARATION METHOD FOR THE SAME

(75) Inventors: Hiroshi Shimanuki, Utsunomiya (JP); Toshikatsu Katagiri, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 103 days.

(21) Appl. No.: 09/603,053

(22) Filed: Jun. 26, 2000

(30) Foreign Application Priority Data

Jun. 30, 1999 (JP) .......................................... 11-186521

(51) Int. Cl.[7] .................................................. H01M 8/04
(52) U.S. Cl. .............................. 429/23; 429/24; 429/26
(58) Field of Search ............................. 429/22, 23, 24, 429/26, 13

(56) References Cited

U.S. PATENT DOCUMENTS 5,346,778 A * 9/1994 Ewan et al. ........... 204/DIG. 4
5,763,113 A * 6/1998 Meltser et al. ................ 429/13
6,087,028 A * 7/2000 Goto ............................ 429/24
6,365,291 B1 * 4/2002 Margiott ...................... 429/25

FOREIGN PATENT DOCUMENTS

| JP | 6-176784 | * | 6/1994 |
| JP | 10-92455 | * | 4/1998 |
| JP | 11-40180 | * | 2/1999 |
| JP | 11-339830 | * | 12/1999 |

* cited by examiner

*Primary Examiner*—Jonathan Crepeau
(74) *Attorney, Agent, or Firm*—Lahive & Cockfield, LLP; Anthony A. Laurentano

(57) ABSTRACT

A fuel cell system comprises a condenser for separating discharged components discharged from a fuel cell into gas components and water and recovering the water, and a flow rate control unit for controlling a flow rate of a cooling medium supplied to the condenser for performing heat exchange with the discharged components, depending on an operation condition of the fuel cell. Accordingly, the flow rate of the cooling medium can be smoothly controlled depending on the operation condition of the fuel cell.

4 Claims, 8 Drawing Sheets

FUEL CELL SYSTEM AND GAS/LIQUID SEPARATION METHOD FOR THE SAME

BACKGROUND OF THE INVENTION

1. Field of the Invention

The present invention relates to a fuel cell system provided with a fuel cell including an anode electrode and a cathode electrode disposed opposingly with an electrolyte interposed therebetween, for obtaining electromotive force by supplying fuel gas containing hydrogen to the anode electrode while supplying oxygen-containing gas containing oxygen to the cathode electrode. The present invention also relates to a gas/liquid separation method for the same.

2. Description of the Related Art

The fuel cell stack, which is constructed, for example, by stacking a plurality of fuel cells each comprising an anode electrode and a cathode electrode disposed opposingly with a solid polymer ion exchange membrane interposed therebetween, the fuel cell being interposed between separators, has been developed, and it is being practically used for a variety of applications.

Such a fuel cell stack is designed as follows. That is, for example, a reformed gas (fuel gas), which contains a hydrogen-containing gas produced by reforming a mixture liquid (aqueous methanol solution) composed of water and liquid fuel such as methanol, is supplied to the anode electrode. An oxygen-containing gas (air or gas containing oxygen) is supplied to the cathode electrode. Thus, the hydrogen gas is ionized, while it flows through the solid polymer ion exchange membrane. Accordingly, electric energy is obtained at the outside of the fuel cell stack.

The fuel cell stack is provided with a condenser for condensing discharged components discharged from the fuel cell stack and separating them into gas components and water. Recovered water, which is produced by the condenser, is used, for example, as reforming water. Those known as such a technique include, for example, a condensed water recovery apparatus disclosed in Japanese Laid-Open Patent Publication No. 6-176784.

In this conventional technique, the temperature of cooling water supplied to a condensing heat exchanger is measured. A flow rate control valve, which is provided for a bypass piping tube, is controlled depending on an obtained measured value to control the flow rate of warm water to be mixed with the cooling water. Thus, the temperature of the cooling water flowing through the condensing heat exchanger is maintained to be constant. Accordingly, the flow rate of the cooling water supplied by a constant flow pump to the condensing heat exchanger is maintained to be constant, while the amount of heat exchange effected by the condensing heat exchanger is made constant so as to obtain a constant amount of recovered water of the condensing heat exchanger purified by an ion exchange processing apparatus.

However, in the case of the conventional technique described above, the amount of cooling water supplied to the condensing heat exchanger is constant. For this reason, it is necessary to ensure an amount of cooling water so that the discharged components may be sufficiently condensed, corresponding to the process in which the amount of discharged water discharged from the fuel cell stack is increased, i.e., corresponding to the process in which the output of the fuel cell stack is increased. Therefore, the amount of cooling water is set to be a considerably large amount. Even when the output of the fuel cell stack is low, it is necessary to maintain the large amount of cooling water. As a result, such a problem is pointed out that the current consumption of the pump is unnecessarily increased.

SUMMARY OF THE INVENTION

A principal object of the present invention is to provide a fuel cell system which makes it possible to efficiently condense discharged components and obtain a desired amount of recovered water so that the current consumption of a pump is effectively reduced, and a gas/liquid separation method for the same.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
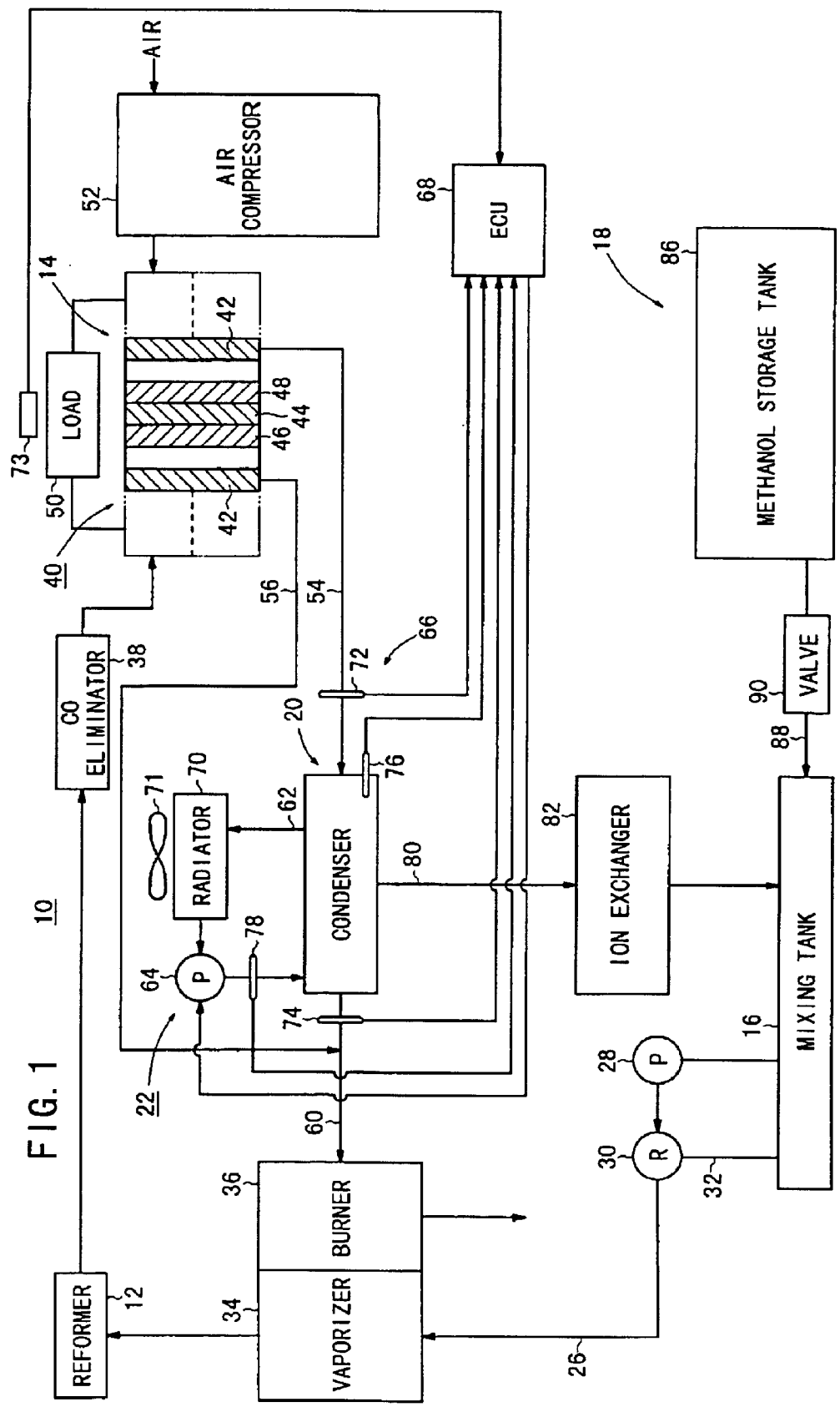
FIG. 1 shows a schematic arrangement of a fuel cell system according to a first embodiment of the present invention.

FIG. 1 shows a schematic arrangement of a fuel cell system 10 according to a first embodiment of the present invention.

The fuel cell system 10 comprises a fuel reformer 12 for producing reformed gas containing hydrogen gas, for example, from a mixture liquid of methanol ($CH_3OH$) and water, a fuel cell 14 to which the reformed gas as the fuel gas is supplied from the reformer 12, a mixing tank 16 for storing the mixture liquid of methanol and water and supplying the mixture liquid to the reformer 12, a methanol supply unit 18 for supplying methanol to the mixing tank 16, a condenser (gas/liquid separation unit) 20 for separating discharged components discharged from the fuel cell 14 into gas components and water to recover the water, and a flow rate control unit 22 for controlling the flow rate of a cooling medium, for example, cooling water to be supplied to the condenser 20 to perform heat exchange with the discharged components, depending on the operation condition of the fuel cell 14.

The mixing tank 16 is provided with a fuel passage 26. A first pump 28 and a regulator 30 are arranged at intermediate positions of the fuel passage 26. A return passage 32 for returning the mixture liquid to the mixing tank 16 is connected to the regulator 30.

The fuel passage 26 is connected to a vaporizer 34. The combustion heat is supplied to the vaporizer 34 from a burner 36. A fuel cell stack 40 is connected to the outlet side of the vaporizer 34 via the reformer 12 and a CO (carbon monoxide) eliminator 38.

The fuel cell stack 40 comprises a plurality of fuel cells 14 and a plurality of separators 42 which are alternately stacked. The fuel cell 14 includes a solid polymer ion exchange membrane 44, and a hydrogen-side electrode (anode electrode) 46 and an air-side electrode (cathode electrode) 48 which are provided opposingly with the solid polymer ion exchange membrane 44 interposed therebetween. The hydrogen-side electrode 46 and the air-side electrode 48 are connected to a load 50 such as an electric motor.

An air compressor 52, which is used to supply the atmospheric air (or gas containing oxygen) as the oxygen-containing gas to the air-side electrode 48, is connected to the fuel cell stack 40. Ends of first and second discharge passages 54, 56, which are used to discharge discharged components from the fuel cell stack 40, are connected to the fuel cell stack 40. The first discharge passage 54 is connected to the cathode side of the fuel cell stack 40. The first discharge passage 54 is connected to the condenser 20. On the other hand, the second discharge passage 56 is connected to the anode side of the fuel cell stack 40, and it merges into a gas passage 60 which makes communication from the condenser 20 to the burner 36.

A piping tube 62 for a cooling medium is arranged for the condenser 20. The flow rate control unit 22 includes a second pump 64 for varying the flow rate of the cooling water supplied to the condenser 20 via the piping tube 62, a detecting means 66 for detecting the operation condition of the fuel cell 14, and ECU (electronic control unit) 68 as a control unit for controlling the output of the second pump 64 on the basis of information detected by the detecting means 66. A radiator 70 and a cooling fan 71 are arranged on the inlet side of the second pump 64.

The detecting means 66 includes at least any one of a sensor 73 for detecting the output of the fuel cell 14, specifically the current value and the voltage value from the fuel cell stack 40, a first temperature sensor 72 for detecting the temperature of the discharged components introduced into the condenser 20, a second temperature sensor 74 for detecting the temperature of the gas components discharged from the condenser 20, a third temperature sensor 76 for detecting the temperature of water recovered by the condenser 20, and a fourth temperature sensor 78 for detecting the temperature of the cooling water.

The first temperature sensor 72 is arranged in the first discharge passage 54. The second temperature sensor 74 is arranged in the gas passage 60. The third temperature sensor 76 is arranged in the condenser 20. The fourth temperature sensor 78 is arranged in the piping tube 62. A water passage 80 is provided at a bottom portion of the condenser 20. The water passage 80 is connected to the mixing tank 16 via an ion exchanger 82 intervening therebetween.

The methanol supply unit 18 is provided with a methanol storage tank 86 which is designed to have a relatively large capacity. A methanol passage 88 is connected to the methanol storage tank 86. The methanol passage 88 is connected to the mixing tank 16 via an opening/closing valve 90.

The operation of the fuel cell system 10 according to the first embodiment constructed as described above will be explained below.

At first, when the operation is started, a predetermined amount of the mixture liquid of methanol and water, which is the liquid fuel stored in the mixing tank 16, is allowed to pass through the fuel passage 26, and it is supplied to the vaporizer 34 by the aid of the regulator 30 in accordance with the action of the first pump 28. The mixture liquid, which is vaporized by the vaporizer 34 by the aid of the combustion heat supplied from the burner 36, is fed to the reformer 12, and it is reformed. Accordingly, the reformed gas (fuel gas) is obtained, which contains hydrogen gas and carbon dioxide gas. Carbon monoxide is removed from the reformed gas by the CO eliminator 38, and then the reformed gas is supplied to the respective hydrogen-side electrodes 46 of the fuel cell stack 40.

On the other hand, the atmospheric air (or gas containing oxygen) is introduced as the oxygen-containing gas from the air compressor 52 into the respective air-side electrodes 48 of the fuel cell stack 40. Therefore, the hydrogen gas contained in the reformed gas is ionized (converted into hydrogen ion) in the respective fuel cells 14, and the ion flows in the solid polymer ion exchange membrane 44 toward the air-side electrode 48. The hydrogen ion reacts with oxygen and electron on the air-side electrode 48 to produce water. The electron serves as the electric energy to drive the load 50. On the other hand, the discharged components, which are discharged from the air-side electrode 48 and the hydrogen-side electrode 46, are introduced into the first and second discharge passages 54, 56 respectively.

The discharged components, which are discharged to the first discharge passage 54, are introduced into the condenser 20 to be separated into water and gas components. The gas components are fed to the burner 36 via the gas passage 60. The discharged components, which are introduced into the second discharge passage 56, merge into the gas passage 60, and they are fed to the burner 36.

The water (condensed water), which is produced in the condenser 20, passes through the water passage 80 and the ion exchanger 82, and it is supplied to the mixing tank 16. On the other hand, the methanol in the methanol storage tank 86 passes through the methanol passage 88 in accordance with the opening action of the opening/closing valve 90, and it is supplied to the mixing tank 16. Accordingly, a predetermined amount of the mixture liquid of methanol and water is stored in the mixing tank 16.

In the condenser 20, the cooling water, which circulates in the piping tube 62, effects the heat exchange with the discharged components discharged from the fuel cell stack 40. When the discharged components are separated into the water and the gas components, the second pump 64 is operated to set the amount of the cooling water to be supplied to the condenser 20.

In the first embodiment, the flow rate control unit 22 regulates the output of the second pump 64 depending on the operation condition of the fuel cell stack 40. At first, in the fuel cell system 10, the amount of produced condensed water is postulated in accordance with the various detected conditions detected by the detecting means 66.

Figure 2:
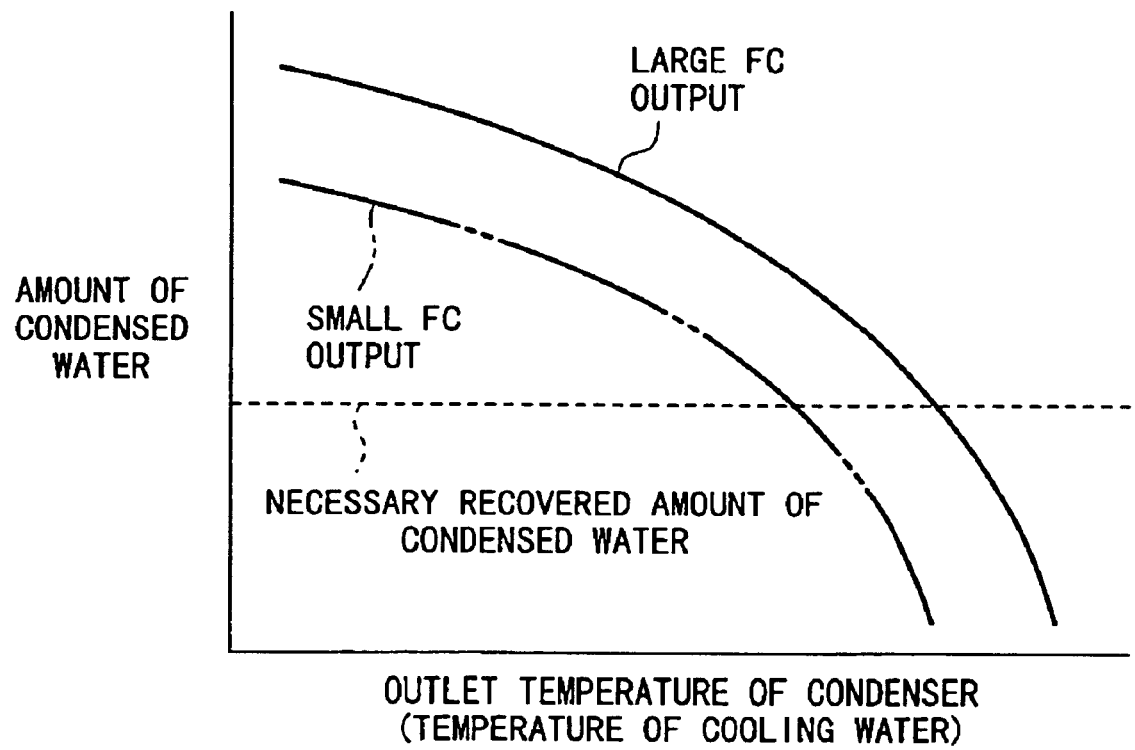
FIG. 2 illustrates the relationship between the amount of condensed water and various detecting means.

Specifically, as shown in FIG. 2, when the output of the fuel cell 14 (FC output) is large, the amount of condensed water is increased. On the other hand, as the outlet temperature of the condenser 20 is increased, the amount of produced condensed water is decreased. Similarly, when the temperature of the cooling water is high, the amount of condensed water is decreased as well.

Figure 3:
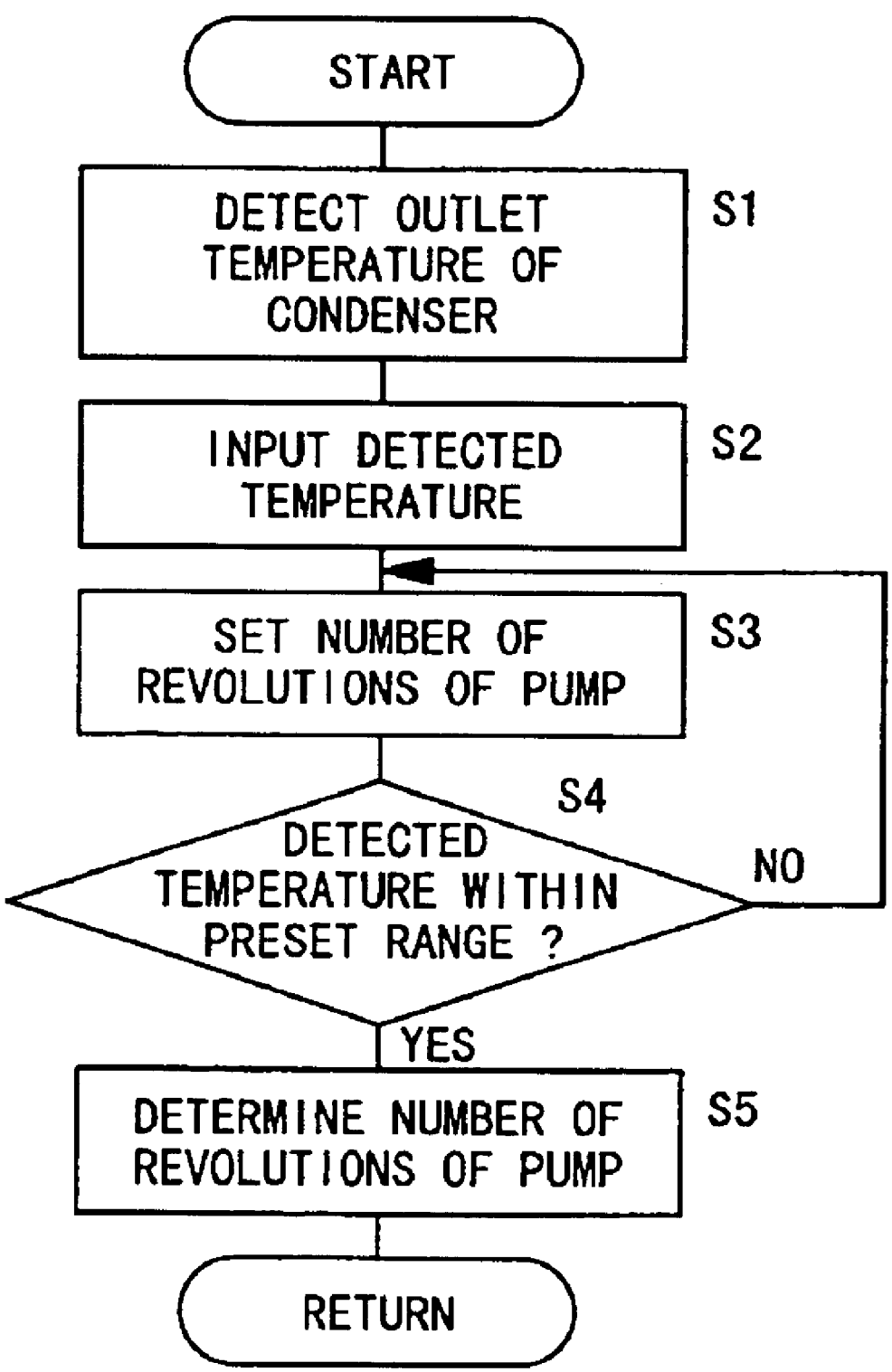
FIG. 3 shows a flow chart for a case in which the pump is controlled on the basis of the outlet temperature of the condenser.

Explanation will now be made below with reference to a flow chart shown in FIG. 3 for the procedure for controlling the output of the second pump 64 on the basis of the outlet temperature of the condenser 20.

The discharged components having a predetermined temperature are introduced into the condenser 20 as the fuel cell stack 40 is operated. The discharged components are separated into the gas components and water. The gas components are discharged to the gas passage 60. The gas passage 60 is provided with the second temperature sensor 74. The second temperature sensor 74 detects the outlet temperature of the condenser 20 (temperature of the discharged gas) (step S1). The outlet temperature, which is detected by the second temperature sensor 74, is inputted into ECU 68 (step S2), and the output, for example, the number of revolutions of the second pump 64 is set (step S3).

The second pump 64 is controlled in accordance with the number of revolutions set in the step S3. Accordingly, the flow rate of cooling water supplied to the condenser 20 is changed. Further, the outlet temperature of the condenser 20 is detected by the second temperature sensor 74, and it is judged whether or not the detected temperature is within a preset range (step S4). If it is judged that the detected temperature is within the preset range (YES in the step S4), the routine proceeds to the step S5 to determine the number of revolutions of the second pump 64.

As described above, in the first embodiment, the number of revolutions of the second pump 64 is determined on the basis of the outlet temperature of the condenser 20. Therefore, the second pump 64 is controlled to have the optimum number of revolutions (output) corresponding to the amount of condensed water. Accordingly, such an effect is obtained that the current consumption of the second pump 64 can be effectively reduced. Further, as shown in FIG. 2, the correlation is given between the outlet temperature of the condenser 20 and the amount of condensed water. It is possible to arbitrarily change the obtained amount of condensed water by arbitrarily set the outlet temperature of the condenser 20.

Figure 4:
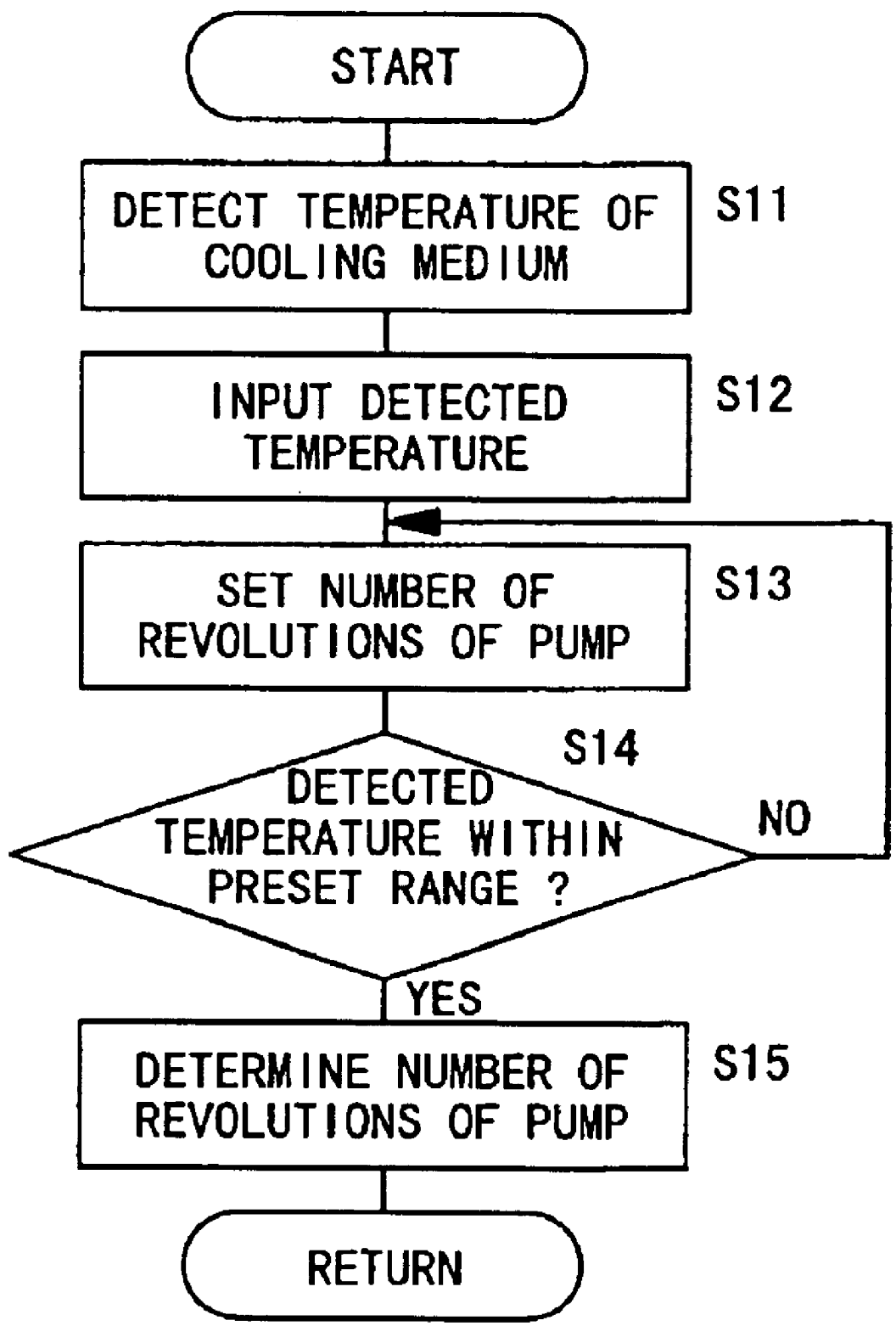
FIG. 4 shows a flow chart for a case in which the pump is controlled on the basis of the temperature of the cooling medium.

Next, explanation will now be made below with reference to a flow chart shown in FIG. 4 for the procedure for controlling the output of the second pump 64 on the basis of the temperature of the cooling water circulating in the piping tube 62.

The piping tube 62 is provided with the fourth temperature sensor 78 which is arranged closely to the outlet side of the second pump 64. The temperature of the cooling water discharged from the second pump 64 is detected by the aid of the fourth temperature sensor 78 (step S11). The detected temperature is inputted into ECU 68 (step S12) to set the number of revolutions of the second pump 64 (step S13). It is judged whether or not the detected temperature is within a preset range (step S14). If the detected temperature is within the preset range, the routine proceeds to the step S15 to determine the number of revolutions of the second pump 64.

Accordingly, the second pump 64 is reliably controlled corresponding to the amount of condensed water on the basis of the temperature of the cooling water. It is advantageous that the current consumption of the second pump 64 can be reduced by using the simple system.

Figure 5:
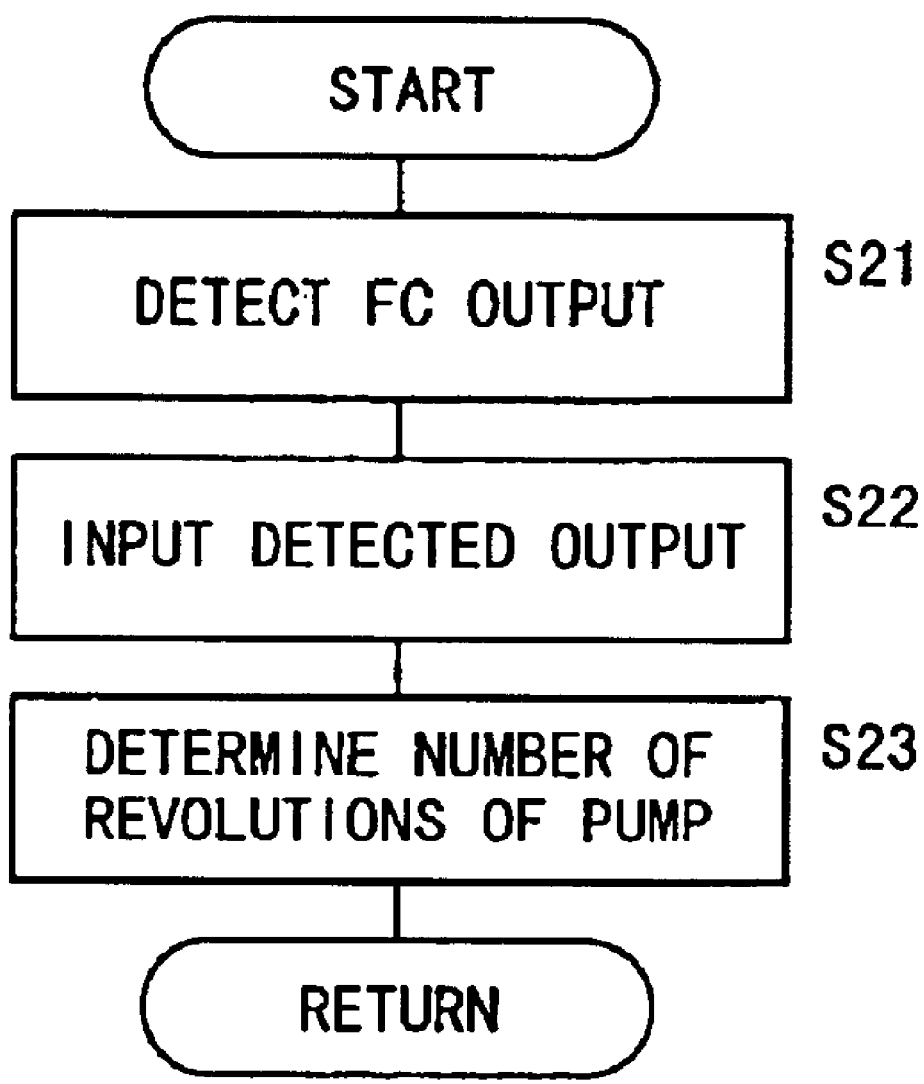
FIG. 5 shows a flow chart for a case in which the pump is controlled on the basis of the output of the fuel cell.

When the output of the second pump 64 is controlled on the basis of the output of the fuel cell stack 40, the output of the fuel cell stack 40, for example, the current value or the voltage value is firstly detected as shown in a flow chart in FIG. 5 (step S21). The detected output is inputted into ECU 68 (step S22). ECU 68 determines the number of revolutions of the second pump 64 (step S23).

Therefore, when the output of the fuel cell stack 40 is low, the second pump 64 is not operated at an unnecessarily high output. The number of revolutions of the second pump 64 is effectively set depending on the increase and decrease in output of the fuel cell stack 40. Accordingly, such an effect is obtained that the output of the second pump 64 is efficiently controlled.

Figure 6:
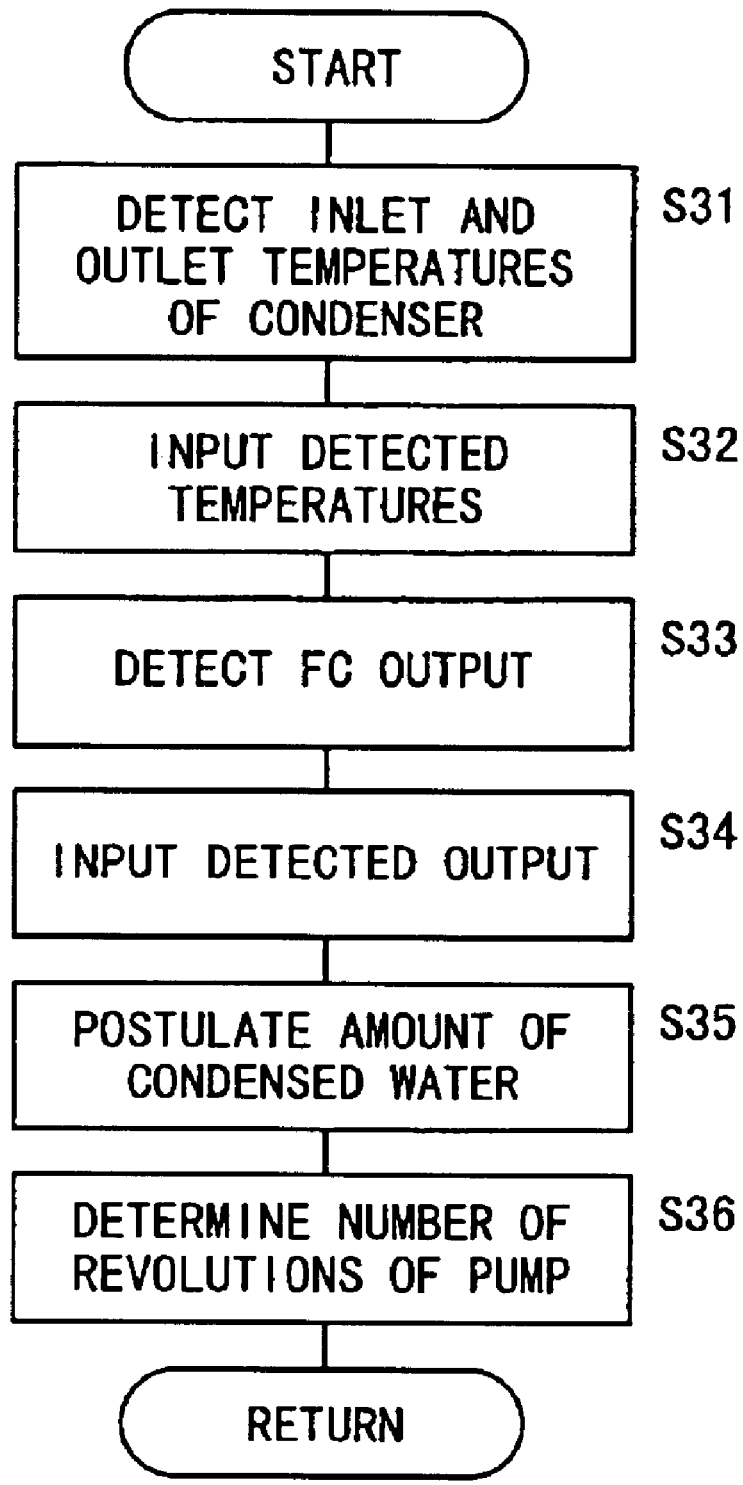
FIG. 6 shows a flow chart for a case in which the pump is controlled on the basis of the outlet and inlet temperatures of the condenser and the output of the fuel cell.

When the output of the second pump 64 is controlled on the basis of the inlet and outlet temperatures of the condenser 20 and the output of the fuel cell stack 40, the inlet temperature and the outlet temperature of the condenser 20 are firstly detected by the aid of the first and second temperature sensors 72, 74 as shown in a flow chart in FIG. 6 (step S31). The detected temperatures are inputted into ECU 68 (step S32). Further, the output of the fuel cell stack 40 is detected, and the detected output is inputted into ECU 68 (steps S33 and S34). The amount of condensed water is postulated on the basis of the results of the detection (step S35), and the number of revolutions of the second pump 64 is determined (step S36).

Accordingly, the following effect is obtained. That is, the amount of condensed water is correctly estimated. The output of the second pump 64 is effectively controlled on the basis of the amount of condensed water. The amount of condensed water, which is actually obtained, can be arbitrarily set.

Figure 7:
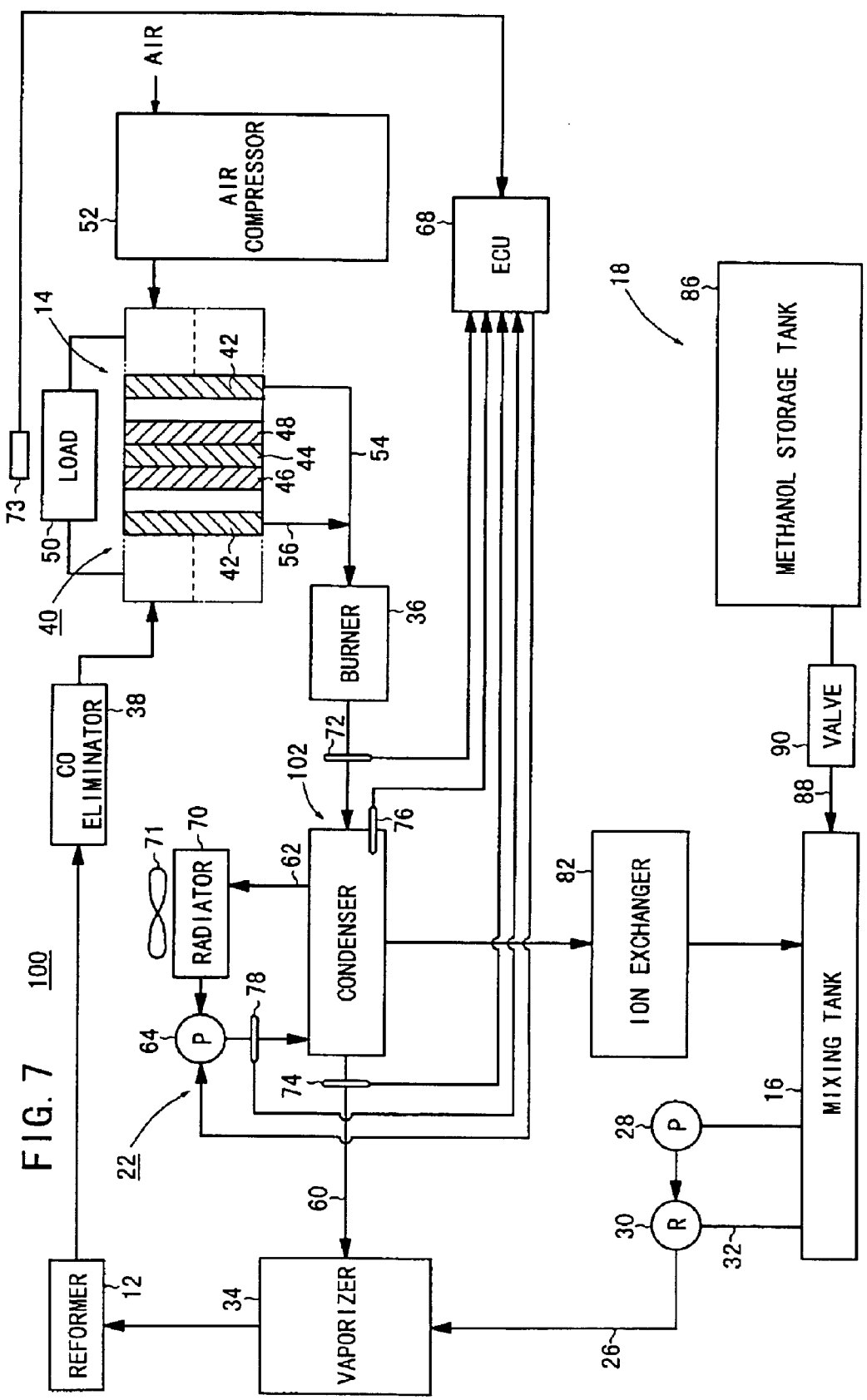
FIG. 7 shows a schematic arrangement of a fuel cell system according to a second embodiment of the present invention.

FIG. 7 shows a schematic arrangement of a fuel cell system 100 according to a second embodiment of the present invention. The same constitutive components as those of the fuel cell system 10 according to the first embodiment are designated by the same reference numerals, detailed explanation of which will be omitted. Explanation will be made in the same manner as described above for a third embodiment which will be explained later on.

In the fuel cell system 100, a condenser 102 is arranged between the burner 36 and the vaporizer 34. The discharged components, which are discharged from the fuel cell stack 40, are introduced into the burner 36 from the first and second discharge passages 54, 56, and then they are introduced into the condenser 102.

In the fuel cell system 100 constructed as described above, the discharged components, which are discharged from the fuel cell stack 40, are firstly fed to the burner 36, and they are heated to a considerably high temperature (for example, 200° C. to 250° C.), and they are fed to the condenser 102 in a state of containing a large amount of steam. Accordingly, a relatively large amount of condensed water is produced from the condenser 102. On the other hand, the output of the second pump 64 is set to be high in order to perform heat exchange with the discharged components having the considerably high temperature.

In the fuel cell system 100 according to the second embodiment, the output of the second pump 64 is controlled on the basis of the operation condition of the fuel cell stack 40. The same effects as those obtained in the first embodiment are obtained, for example, such that the current consumption of the second pump 64 can be effectively reduced.

Figure 8:
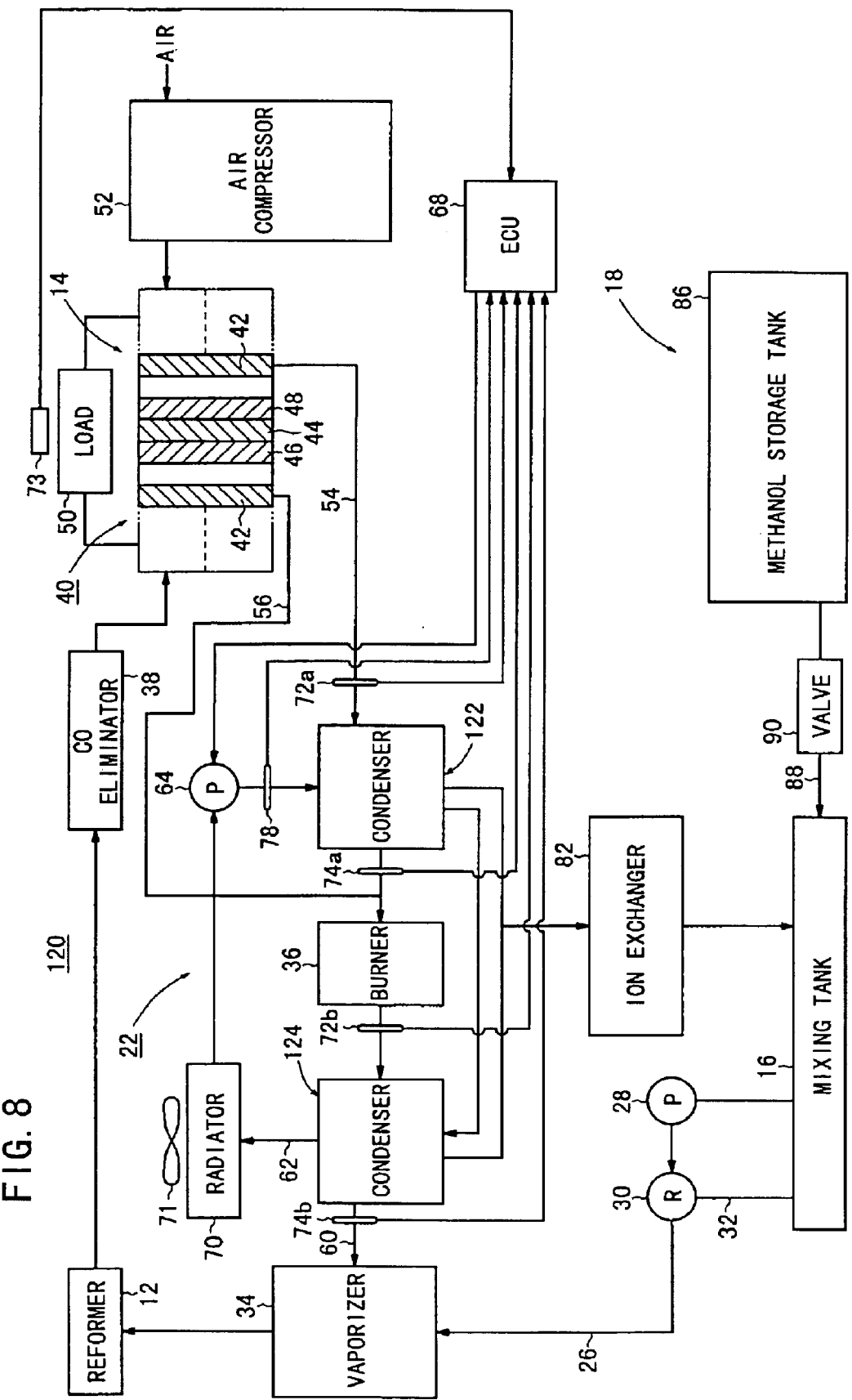
FIG. 8 shows a schematic arrangement of a fuel cell system according to a third embodiment of the present invention.

FIG. 8 shows a schematic arrangement of a fuel cell system 120 according to a third embodiment of the present invention. In the fuel cell system 120, first and second condensers 122, 124 are arranged on the upstream side and the downstream side of the burner 36 respectively. First temperature sensors 72a, 72b and second temperature sensors 74a, 74b are arranged in the vicinity of inlets and outlets of the first and second condensers 122, 124. The third embodiment is constructed by combining the structures of the first and second embodiments, which provides the same effects as those obtained by the first and second embodiments.

In the first to third embodiments, the system is provided with the flow rate control unit 22 for controlling the flow rate of the cooling water depending on the operation condition of the fuel cell 14. In place thereof, it is possible to use a temperature control unit for controlling the temperature of the cooling water depending on the operation condition of the fuel cell 14.

Explanation will be made, for example, with reference to FIG. 1. The temperature control unit is provided with the radiator 70 and the cooling fan 71 which are arranged on the inlet side of the second pump 64 arranged for the piping tube 62 which is the passage for circulating and transporting the cooling water.

For example, when the operation condition of the fuel cell 14 is detected by the aid of the sensor 73, the outputs of the second pump 64 and the cooling fan 71 are controlled on the basis of the detected information. Accordingly, the temperature of the cooling water supplied to the condenser 20 is adjusted.

Therefore, it is possible to supply the cooling water at an optimum flow rate corresponding to the operation condition of the fuel cell 14. It is possible to obtain such an effect that the current consumption of the cooling fan 71 is effectively reduced. Also in the second and third embodiments, the same effect can be obtained by constructing the system in the same manner as described above.

Alternatively, such a temperature control unit may be combined with the flow rate control unit 22 to construct the system. That is, when the temperature control and the flow rate control for the cooling water are performed in a combined manner, then it is possible to supply the cooling water under the optimum condition (optimum flow rate and optimum temperature) corresponding to the operation condition of the fuel cell 14, and the amount of condensed water obtained by the condenser 20 or the like can be accurately adjusted.

A map for the temperature and the flow rate of the cooling water may be prepared beforehand, and the map may be previously stored in ECU 68. Accordingly, the temperature control and the flow rate control can be performed for the cooling water in accordance with the map, which is advantageous in that the control is further simplified.

In the fuel cell system according to the present invention, the flow rate and/or the temperature of the cooling medium to be supplied to the gas/liquid separator for performing the heat exchange with the discharged components is controlled depending on the operation condition of the fuel cell. Therefore, it is possible to perform the control economically and efficiently depending on the amount of recovered water.

What is claimed is:

1. A fuel cell system provided with a fuel cell including an anode electrode disposed opposingly with an electrolyte interposed there between, for obtaining electromotive force by supplying fuel gas containing hydrogen to said anode electrode while supplying oxygen-containing gas containing oxygen to said cathode electrode, said fuel cell system comprising:
    a gas/liquid separator for separating discharged components discharged from said fuel cell into gas components and water, an amount of said water which said discharged components are separated into by said gas/liquid separator being changed depending on an operation condition of said fuel cell; and
    a flow rate control unit for controlling a flow rate of a cooling medium supplied to said gas/liquid separator for performing heat exchange with said discharged components, the flow rate control unit comprising a pump for varying said flow rate of said cooling medium supplied to said gas/liquid separator and a control unit for controlling an output of said pump
    wherein the flow rate of said cooling medium is controlled depending on the amount of said water, and said operation condition of said fuel cell is detected by detecting means for detecting at least one of a current value or voltage value from said fuel cell, wherein the control unit controls the output of the pump on the basis of information detected by said detecting means.

2. A fuel cell system provided with a fuel cell including an anode electrode and a cathode electrode disposed opposingly with an electrolyte interposed therebetween, for obtaining electromotive force by supplying fuel gas containing hydrogen to said anode electrode while supplying oxygen-containing gas containing oxygen to said cathode electrode, said fuel cell system comprising:
    a gas/liquid separator for separating discharged components discharged from said fuel cell into gas components and water, an amount of said water which said discharged components are separated into by said gas/liquid separator being changed depending on an operation condition of said fuel cell; and
    a temperature control unit for controlling a temperature of a cooling medium supplied to said gas/liquid separator for performing heat exchange with said discharged components, wherein said temperature control unit includes a radiator arranged for a piping tube for circulating and supplying said cooling medium to said gas/liquid separator, a cooling fan provided together with said radiator, and a control unit for controlling an output of said cooling fan,
    wherein the temperature of said cooling medium is controlled depending on the amount of said water, and said operation condition of said fuel cell is detected by detecting means for detecting at least any one of a current value or voltage value from said fuel cell, wherein the control unit controls the output of said cooling fan on the basis of information detected by said detecting means.

3. A fuel system provided with a fuel cell including an anode electrode and a cathode electrode disposed opposingly with an electrolyte interposed therebetween, for obtaining electromotive force by supplying fuel gas containing hydrogen to said anode electrode while supplying oxygen-containing gas containing oxygen to said cathode electrode, said fuel cell system comprising:
    a gas/liquid separator for separating discharged components discharged from said fuel cell into gas components and water, an amount of said water which said discharged components are separated into by said gas/liquid separator being changed depending on an operation condition of said fuel cell;
    a flow rate control unit for controlling a flow rate of a cooling medium supplied to said gas/liquid separator for performing heat exchange with said discharged components, the flow rate of said cooling medium being controlled depending on the amount of said water, wherein said flow rate control unit includes a pump for varying said flow rate of said cooling medium supplied to said gas/liquid separator and a control unit for controlling an output of said pump; and
    a temperature control unit for controlling a temperature of a cooling medium depending on the amount of said water,
    wherein said operation condition of said fuel cell is detected by detecting means for detecting at least any one of a current value or voltage value from said fuel cell, wherein the control unit controls the output of said pump on the basis of information detected by said detecting means.

4. The fuel cell system according to claim 3, wherein said temperature control unit includes:
    a radiator arranged for a piping tube for circulating and supplying said cooling medium to said gas/liquid separator,
    a cooling fan provided together with said radiator; and
    a control unit for controlling output of said cooling fan on the basis of information detected by said detecting means.

* * * * *